United States Patent [19]
Fujita et al.

[11] Patent Number: 5,412,659
[45] Date of Patent: May 2, 1995

[54] INTER-CELLULAR INTERFERENCE DETECTION BY CANCELING DATA CORRUPTION EVENTS REPORTED BY MOBILE STATIONS

[75] Inventors: Masashi Fujita; Toshitaro Harada, both of Tokyo, Japan

[73] Assignee: NEC Corporation, Tokyo, Japan

[21] Appl. No.: 140,824

[22] Filed: Oct. 25, 1993

[30] Foreign Application Priority Data

Oct. 23, 1992 [JP] Japan .................................. 4-285651

[51] Int. Cl.$^6$ .......................... H04B 7/26; H04Q 7/00
[52] U.S. Cl. .................................. 370/95.1; 370/95.3;
379/59; 455/33.1; 455/54.1; 455/67.3
[58] Field of Search ...................... 370/13, 13.1, 17, 24,
370/29, 85.2, 85.3, 85.7, 85.8, 95.1, 95.2, 95.3,
104.1; 379/58, 59, 60, 63; 455/33.1, 33.2, 34.1,
49.1, 50.1, 53.1, 54.1, 54.2, 56.1, 63, 67.1, 67.3,
68, 69, 70, 7, 9, 10

[56] References Cited

U.S. PATENT DOCUMENTS

| | | | |
|---|---|---|---|
| 4,765,753 | 8/1988 | Schmidt | 379/60 |
| 4,890,332 | 12/1989 | Takahashi | 455/67.3 |
| 5,042,082 | 8/1991 | Dahlin | 455/33.2 |
| 5,159,593 | 10/1992 | D'Amico et al. | 370/95.3 |
| 5,175,867 | 12/1992 | Wejke et al. | 455/33.1 |
| 5,257,399 | 10/1993 | Kallin et al. | 379/59 |

*Primary Examiner*—Alpus Hsu
*Attorney, Agent, or Firm*—Foley & Lardner

[57] ABSTRACT

Within a cell of a TDMA mobile communication system, each mobile station transmits a control message on an up-link frame. On receiving it, the base station determines if the message quality is affected during transmission. A corruption status indication is stored into a position of a frame status memory corresponding to the up-link frame if the message quality is low. When the base station detects a frame identification contained in the received message, it erases the corruption status indication stored in a position identified by the detected frame identification, and transmits a control message on a down-link frame, containing the result of the quality determination. In response, the mobile station stores the identification of the frame of the message into a collision memory, and retransmits a copy of the up-link control message containing the frame identification.

4 Claims, 5 Drawing Sheets

MOBILE STATION

INTER-CELLULAR INTERFERENCE DETECTION BY CANCELING DATA CORRUPTION EVENTS REPORTED BY MOBILE STATIONS

BACKGROUND OF THE INVENTION

1. Field of the Invention

The present invention relates generally to TDMA (time division multiple access) cellular mobile communication systems, and more specifically to a technique for detecting interference affecting the up-link control channel of a TDMA cellular mobile communication system when the control channel carries no signaling message.

2. Description of the Related Art

In a TDMA cellular mobile communication system, interference that occurs on the up-link control channel (for transmission from mobiles to cell-site base station) from adjacent cells in the absence of a control message from mobile stations is detected at the base station and counted at intervals and reported to the management center for evaluation. The current method of interference detection involves the evaluation of the quality of signals received on the up-link control channel. However, data corruption occurs when more than one mobile station simultaneously transmits a control message. Due to the inability of the base station to make a distinction between inter-cellular interference and intra-cellular interference, the base station recognizes such a simultaneous transmission as an inter-cellular interference event. Therefore, the current method is not satisfactory to obtain a precision interference count.

SUMMARY OF THE INVENTION

It is therefore an object of the present invention to provide a technique for precisely detecting an inter-cellular interference affecting the control channel of up-link frames established in each cell of a TDMA cellular mobile communication system when that up-link control channel carries no control messages.

The object of this invention is achieved by canceling data corruption events caused by collision between mobile stations from the list of inter-cellular interference events which have been detected on the up-link control channel carrying no control messages.

The object is achieved in a TDMA communication system where a base station and mobile stations establish up-link frames for transmission of signals in a direction from the mobile stations to the base station and down-link frames for transmission of signals in a direction from the base station to the mobile stations, wherein the base station includes a frame status memory and each of the mobile station includes a collision memory.

According to the present invention, each mobile station transmits an up-link control message on one of the up-link frames when it is available for all the mobile stations. On receiving it, the base station determines whether the quality of the received up-link control message is affected during transmission. A corruption status indication is stored into a position of the frame status memory which corresponds to the up-link frame on which the control message is transmitted if the quality is determined to be affected. When the base station detects a frame identification contained in the received up-link control message, it erases a corruption status indication stored in a position of the frame status memory identified by the detected frame identification. The base station transmits a down-link control message on one of the down-link frames, containing an indication whether the quality of the received up-link control message is determined as being affected or not during transmission. On receiving the down-link control message, the mobile station examines the indication contained therein. If it indicates that the quality of the up-link control message is determined as being affected, the frame identification of the up-link frame is stored into the collision memory, and a copy of the transmitted up-link control message is retransmitted, containing a copy of the stored frame identification. In this way, a corruption status indication stored in the frame status memory during the previous data collision event is erased by a report from the mobile station. If the second transmission should fail, the retransmission process is repeated until an indication is given that the quality of the up-link control message is determined as being unaffected.

At intervals, the corruption status indications stored in the frame status memory are counted to produce an inter-cellular interference count.

BRIEF DESCRIPTION OF THE DRAWINGS

The present invention will be described in further detail with reference to the accompanying drawings, in which.

DETAILED DESCRIPTION

Figure 1:
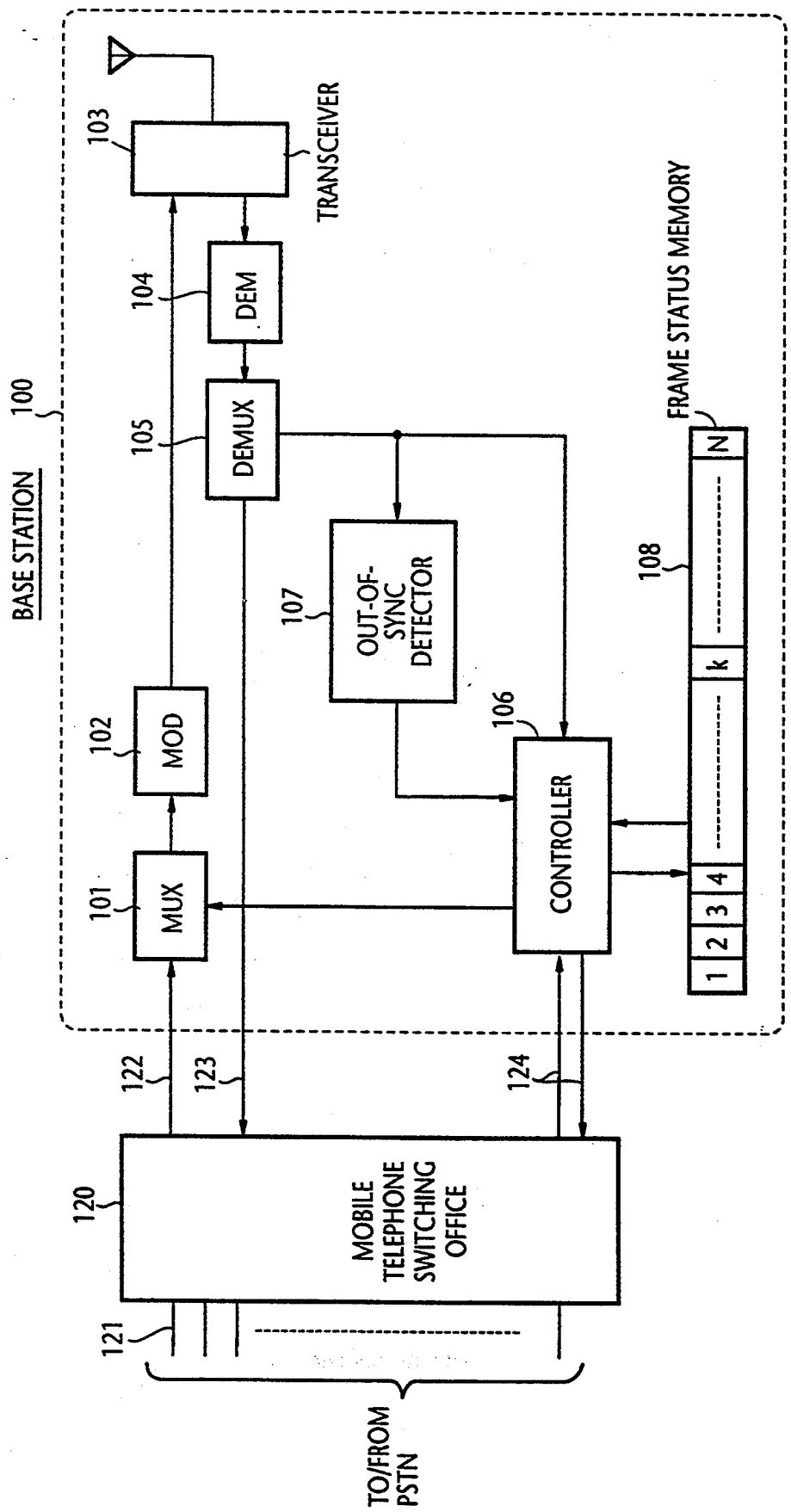
FIG. 1 is a block diagram of a base station of a TDMA cellular mobile communication system of the present invention.

Referring now to FIG. 1, there is shown a schematic block diagram of a cell-site base station of a time division multiple access (TDMA) cellular mobile communication system. The base station, designated 100, includes a multiplexer 101 for receiving a down-link time-division multiplex (TDM) signal via a land-line 122 from a mobile telephone switching office (MTSO) 120 which is in turn connected by trunks 121 to the public switched telephone network, not shown. Multiplexer 101 combines the incoming TDM signal with a signaling message from the cell-site controller 106 so that it is inserted into the control slot (i.e., down-link control channel) of a down-link frame. To provide overall control of the base station, the controller 106 is connected via control lines 124 to the MTSO 120 to exchange signaling messages. The output of multiplexer 101 is applied to a modulator 102 where it is modulated upon a carrier and supplied to a transceiver 103 for amplification and transmission to mobile stations.

Signals from mobile stations, either information or signaling messages, are transmitted on appropriate time slots of an up-link frame if an idle indication is given by the control slot of a previous up-link frame, and received by transceiver 103 where it is amplified and then converted by a demodulator 104 to a baseband signal for coupling to a demultiplexer 105. Signaling messages, such as call-setup signals, from mobile stations are separated by demultiplexer 105 from information signals and supplied to the controller 106 and an out-of-sync detector 107 which provides an output signal to the controller 106 when it detects an out-of-sync condition of a received control message when interference occurs. The information signals from demultiplexer 105 are transmitted via a land-line 123 to the MTSO 120 as an up-link TDM signal. A frame status memory 108 is connected to the controller 106. The memory 108 has a plurality of storage locations corresponding respectively to up-link frames starting with frame #1 to frame #N to store a bit "0" in each location if a data corruption is not detected in the corresponding frame by the controller 106 and store a bit "1" if a data corruption is detected. As will be described, the controller 106 reads frame status data from memory 108 at intervals, and reports the number of interferences to the MTSO 120.

Figure 2:
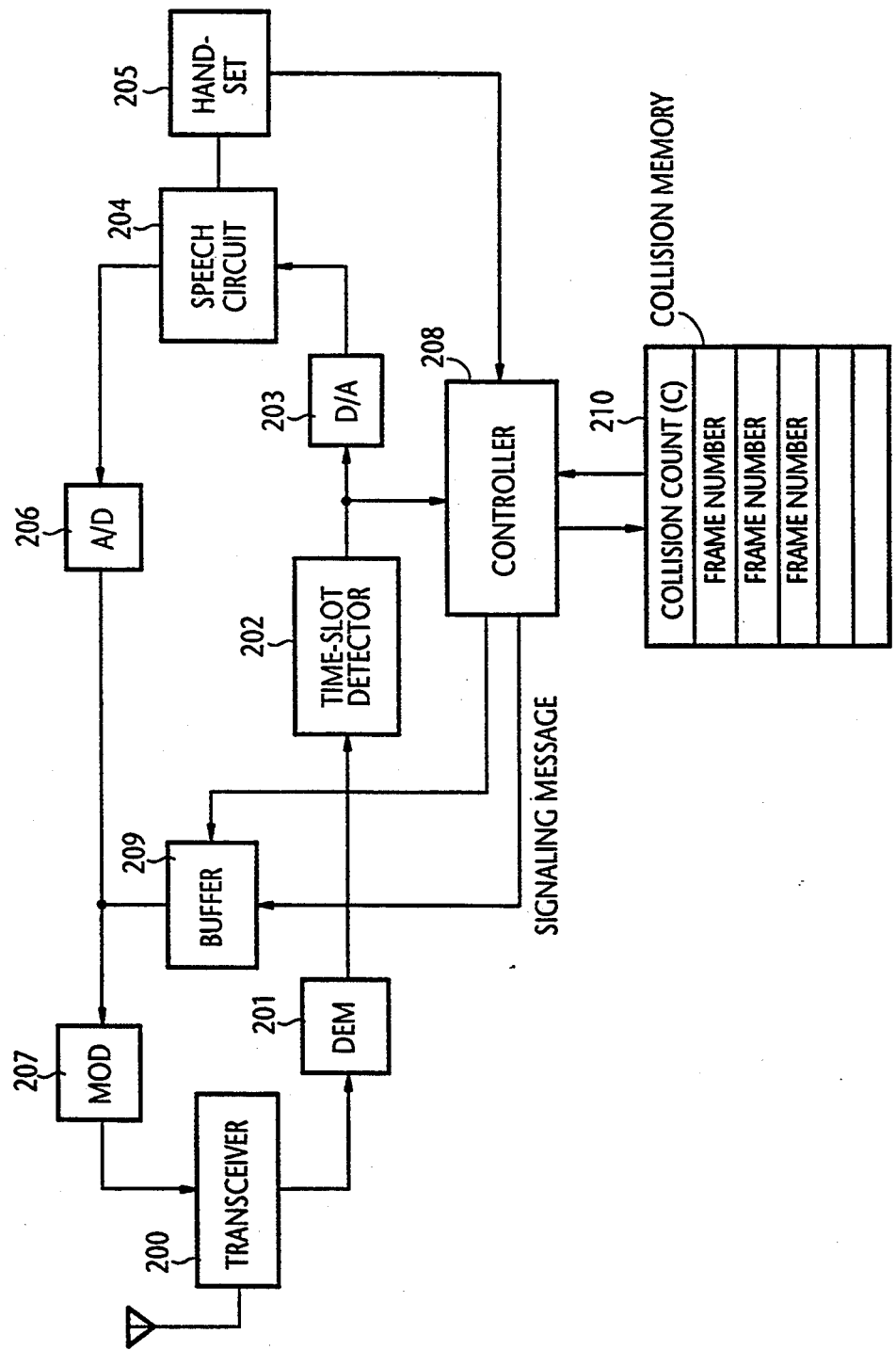
FIG. 2 is a block diagram of a mobile station of the TDMA cellular mobile communication system of the present invention.

As shown in FIG. 2, each mobile station receives down-link frames from the base station 100 through a transceiver 200. The received frames are demodulated to baseband frame signals by a demodulator 201 and applied to a time-slot detector 202 where the message addressed to the mobile station is detected. The output of time-slot detector 202 is coupled to a digital-to-analog converter 203 in which it is converted to an analog signal and supplied to a speech circuit 204 for coupling to the handset 205. Signals from the handset are coupled through the speech circuit 204 to an analog-to-digital converter 206 where it is converted to a digital signal and coupled to a modulator 207 for conversion to the up-link frequency for transmission through the transceiver 200.

A controller 208 provides an overall control of the mobile station by receiving a call-request signal from the handset 205 to generate a signaling message and stores it in a buffer 209 whose output is connected to the input of modulator 207 and receiving control channel data from time-slot detector 202 to determine whether the next up-link frame is busy or idle, and determine whether a previously sent message is properly received or not by the base station 100. The effect of the buffer 209 is to produce a copy of the signaling message for retransmission if a previously transmitted signal is corrupted by data collision. For this purpose, the controller 208 enables the buffer 209 to transmit the stored message if a previous transmission is found to be futile and directs it to discard the stored message if the previous transmission is found to be properly received by the base station. Further provided in the mobile station is a collision memory 210 connected to the controller 208. The memory 209 has a plurality of storage locations, one of which is used for storing a collision count "C" indicating the number of data collisions encountered in sequence and the remainder for storing frame numbers identifying the frames where data collision has occurred. Controller 208 constantly reads data from the collision memory 209 and transmits it on an up-link control channel together with a signaling message.

Figure 5:
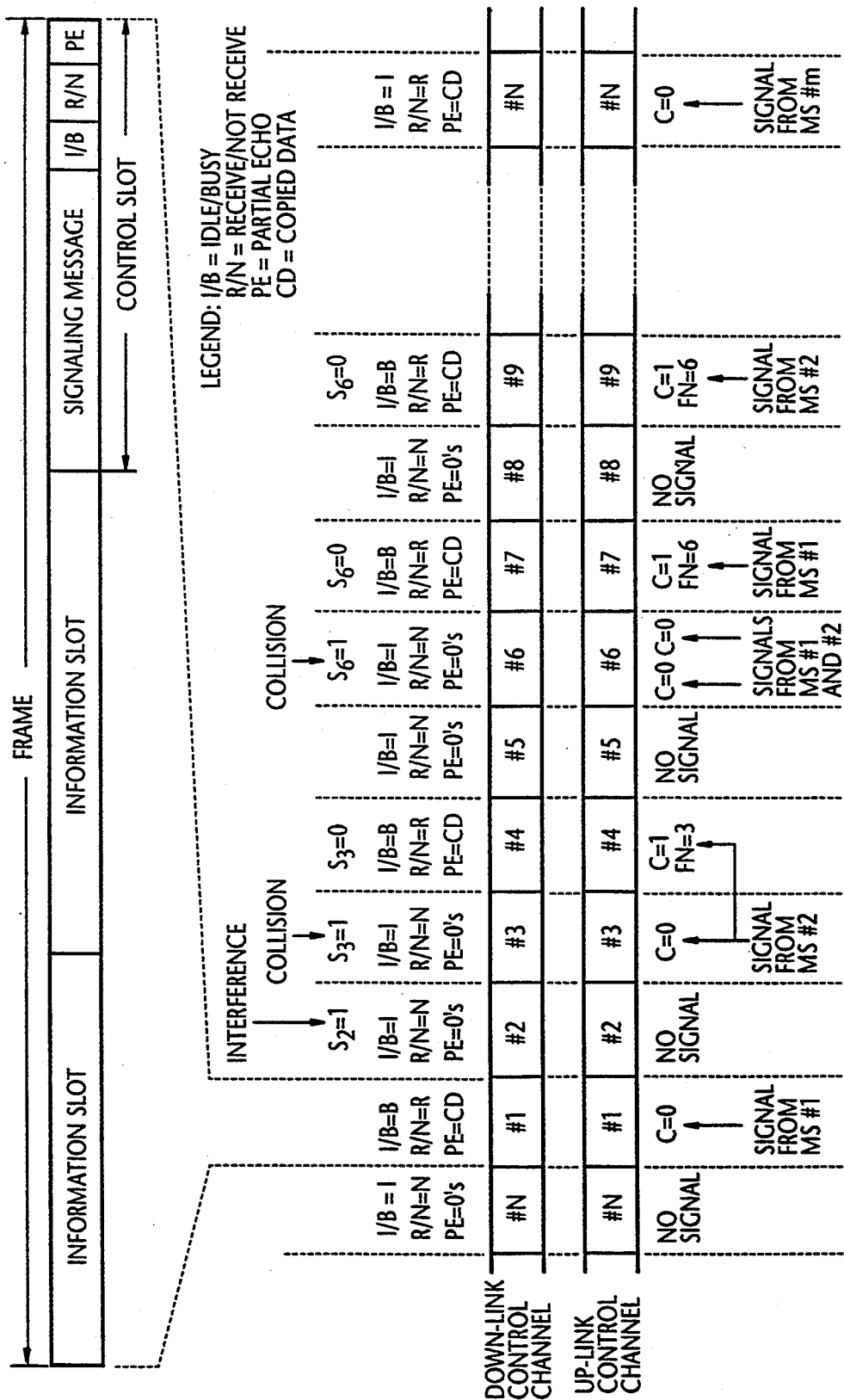
FIG. 5 is a time sequence diagram useful for describing the operation of the present invention.

Each down-link frame includes, for example, two information slots and a control slot containing a signaling message, an idle/busy (I/B) field, a receive/not receive (R/N) field and a partial echo (PE) field as shown in FIG. 5. Each mobile station examines the I/B field to determine whether it can send a signal on the next frame in a manner to be described. The R/N and PE fields are also examined to determine if a signal transmitted from the mobile station is properly received by the base station.

Figure 3:
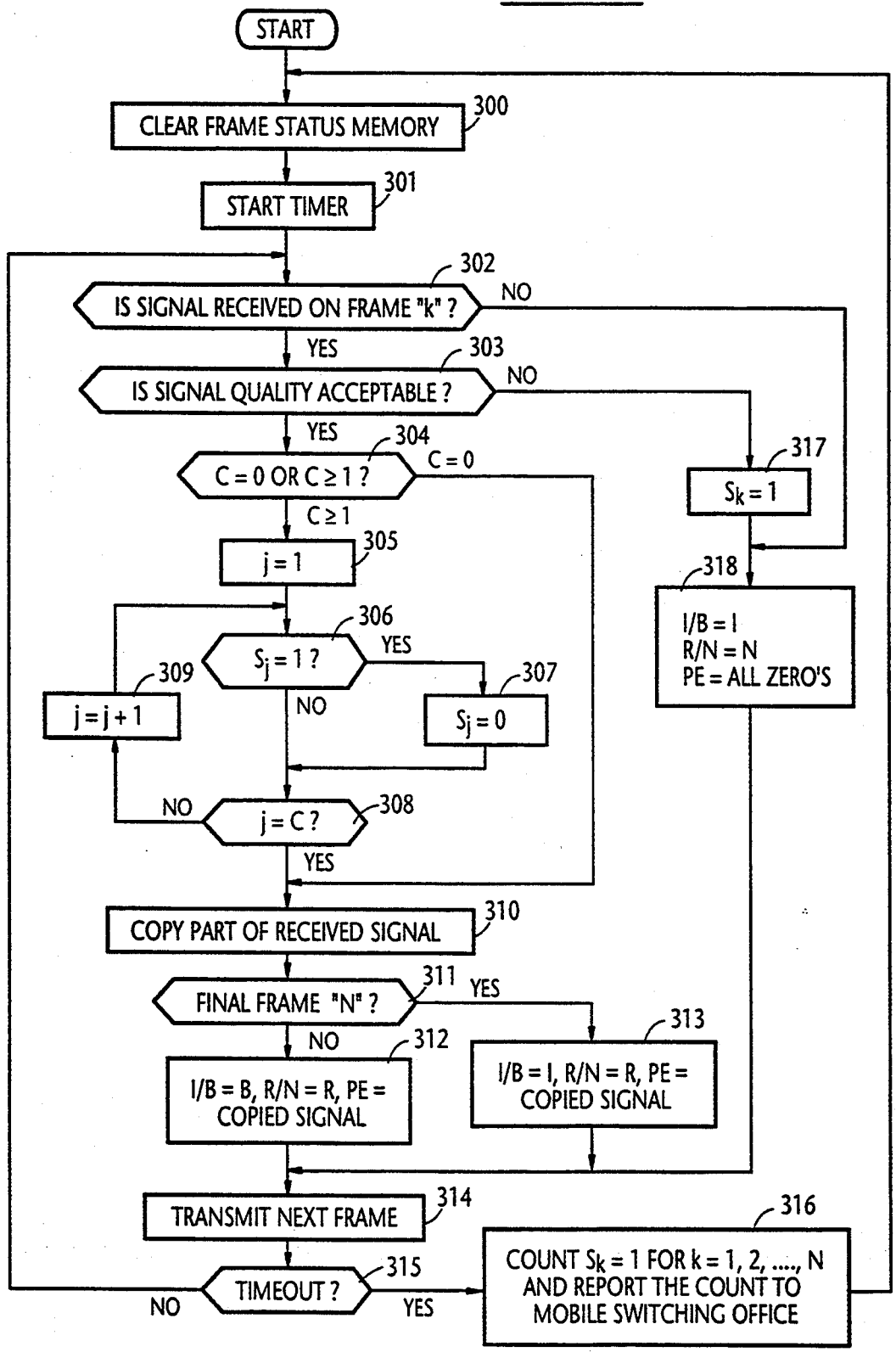
FIG. 3 is a flowchart of a program performed by the controller of the base station.

A flowchart of a program for the controller 106 is shown in FIG. 3 for controlling the base station. Program execution starts with action step 300 which clears the contents of the frame status memory 108 by resetting them to all zeroes. At step 301, a report interval timer is started for defining intervals at which the controller 106 produces an inter-cellular interference count report. At step 302, the controller 106 checks to see if a signaling message is received on a frame "k". If the answer is negative, control branches to step 318 to set an idle indication to the I/B field, a "not-receive" indication to the R/N field, and all zeroes into the PE field. Exit then is to step 314 to transmit the next down-link frame, and control exits to decision step 315 to check to see if the period of the timer has expired. If not, control returns to decision step 302, it is seen that when there is no signal from mobile stations, an idle indication is given to give a chance to all mobile stations to access the next frame for transmission of a control message.

If the answer at decision step 302 is affirmative, control branches to decision step 303 to receive the output of out-of-sync detector 107 and determines whether the quality of the signal received is acceptable. If the signal, which was received from a mobile station within or outside of the home cell, is determined to be affected during transmission, control yields a negative decision at step 303 and branches to step 317 to set a frame status variable $S_k$ to 1 by storing a bit "1" into the storage location of frame status memory 108 that corresponds to the current frame "k". If the received signal on frame "k" is from an adjacent cell, the signal quality is determined to be affected and the frame status variable $S_k$ is set to 1. If two signals are simultaneously transmitted on frame "k", the variable $S_k$ is likewise set to 1, and will be subsequently reset to 0 in response to a report from one of the contending mobile stations. Thus frame status variable $S_k=1$ indicates that a control message sent on frame "k" from a mobile station has been corrupted by a data collision and should be subsequently altered, or indicates that a signal of unacceptable quality is received from an adjacent cell during the absence of a control message from mobile stations of the home cell and should be unaltered.

Step 318 follows to set the contents of the control slot in the same manner as in the absence of signal from mobile stations and the next frame is transmitted at step 314 as described above. If the signal quality is determined to be acceptable at step 303, control branches to step 304 to examine the collision report field of the up-link control channel and determine if the collision count "C" is equal to zero or equal to or greater than 1.

If C=0 at step 304, control advances to step 310 to copy part of the received signal and checks to see if the current frame if the final frame, i.e., k=N, at step 311. If not, control branches to step 312 to set a busy indication to the I/B field, a "receive" indication to the R/N field, and insert the copied signal to the PE field. If the current frame is the final frame, control branches at step 311 to step 313 to set an idle indication to the I/B field, a "receive" indication to the R/N field and the copied signal to the PE field.

As will be described, the mobile station, which sent the signaling message on a frame except the final frame, will subsequently ignore the I/B=B field if it still has a message to transmit, and other mobile stations are inhibited from transmitting their message. When a final frame is received, the I/B field is forcibly set to "idle" state to allow all mobile stations to gain access to the up-link control channel on the #1 frame of the next multiframe.

At step 314, the base station transmits the next down-link frame. The timer is then checked at step 315 to determine if the timeout period for making a collision report has expired. If the answer is negative, control returns to step 302 to repeat the above process.

If $C \geq 1$ at step 304, the frame status memory 108 is updated with a list of the collision report containing at least one collision frame number. To this end, a collision frame variable j to set equal to 1 at step 305 to access the storage location of the frame status memory 108 that corresponds to the frame number of the first entry of the collision list. Control moves to decision step 306 to determine if the frame position status $S_j$ of that storage location is equal to 1.

If $S_j = 1$, control branches at step 306 to step 307 to reset the status $S_j$ of that storage location to 0. Control moves to step 308 to check to see if j=C. If not, variable j is incremented by 1 at step 309 and control returns to step 306. If $S_j$ is determined to be not equal to 1 at step 306, no action is taken of that storage location and control branches to step 308.

The resetting of $S_j$ to zero at step 307 clears the previous status $S_j = 1$ of the frame which was set in response to the detection of a data collision. Therefore, if status $S_k = 1$ is set at step 317 due to interference from an adjacent cell in the absence of a control message from any mobile station within the home cell zone, it is simply left unaltered in the frame status memory 108 and if it is set in response to a data collision, it will be subsequently altered to 0. Steps 306 to 309 are repeated until variable j is equal to the collision count C. In this manner, the contents of those storage locations of frame status memory 108 that are designated by the frame numbers of the collision list are sequentially accessed and updated.

When the period of the timer expires, control branches at step 315 to action step 316 to count the number of those storage locations of frame status memory 108 which remain set equal to 1, and the controller 106 transmits the count as an interference count to the MTSO 120 and returns to step 300.

Figure 4:
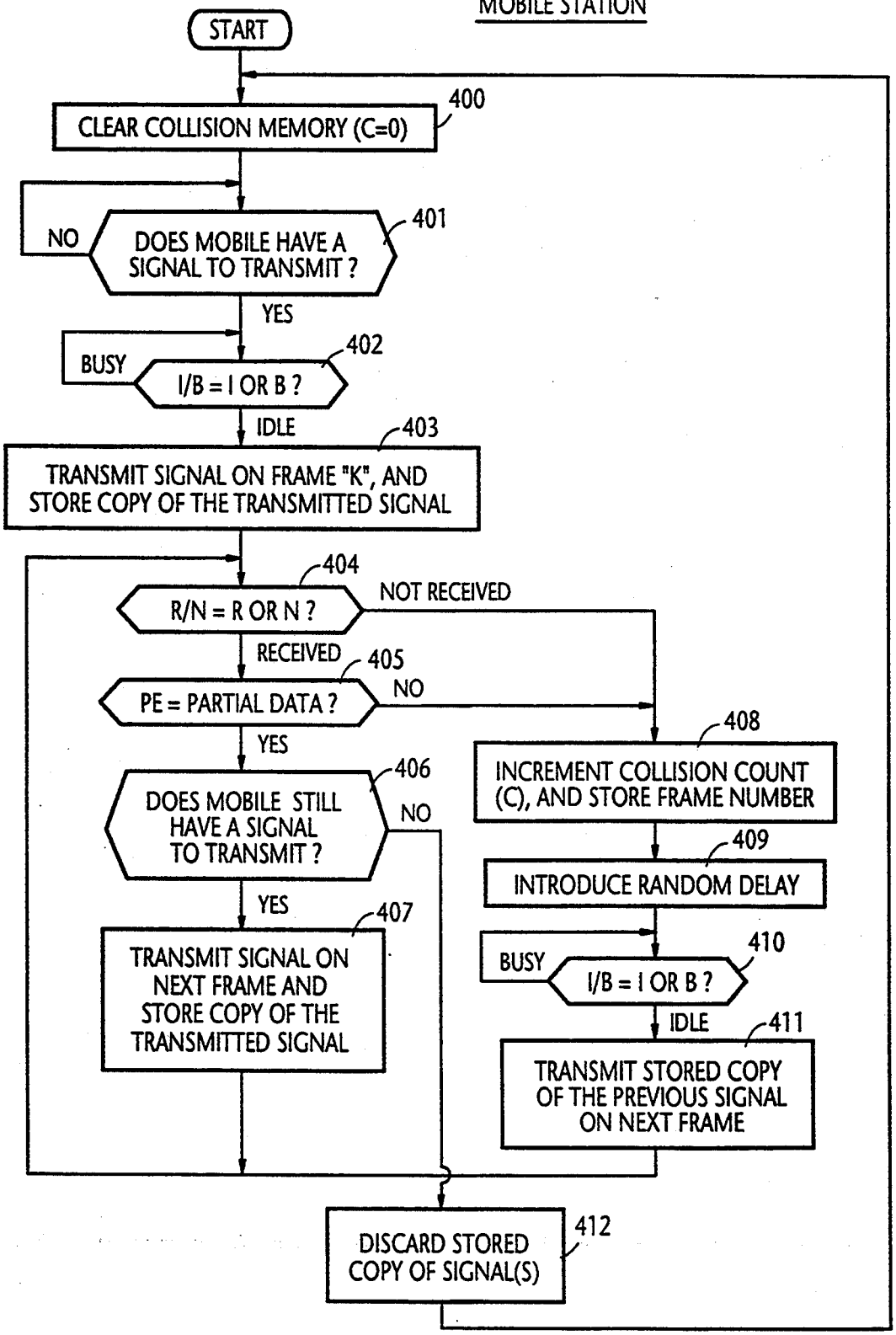
FIG. 4 is a flowchart of a program performed by the controller of the mobile station.

A flowchart of a program for the controller 208 of each mobile station is shown in FIG. 4. Program execution starts with action step 400 which clears the contents of the collision memory 210 by resetting them to all zeroes. When there is a control message to transmit (step 401), the I/B field of the control channel of a received down-link frame is examined at step 402. If an idle indication is given by the I/B field, control branches to step 403 to transmit the control message on the control channel of a subsequent up-link frame "k" from the buffer 209, and keep a copy of the transmitted signal in the buffer. Exit then is to step 404 to examine the R/N field of the received control channel to see if a "receive" or "not receive" indication is given. The up-link control channel contains a collision field which is a copy of the collision memory 210. Initially, the collision count C is set to 0 and no frame number is set in the collision field of the transmitted control message.

If an out-of-sync condition is detected by detector 107 upon transmission of a control message from a mobile station, a "not receive" indication is set into the R/N field, and the mobile station recognizes that the previous message was corrupted by data collision with another mobile station which is either located within the same or adjacent cell zone, and control proceeds to step 408 to increment the collision count value "C" of collision memory 210 by 1 and store into the first entry of the frame number locations of memory 210 the identification number of the frame on which the previous control message was sent. Exit then is to step 409 to introduce a random delay time and then control moves to step 410 to examine the I/B field of a down-link frame which is received following the random delay time. If idle indication is given at step 410, control proceeds to step 411 to transmit the stored copy of the transmitted message from the buffer 209 on an up-link control channel of the next up-link frame, containing a collision field in which the collision count C is set to 0 and no frame number is set. Following the retransmission of the previous message, control returns to step 404.

If the transmitted message is properly received by the base station, a "receive" indication will be set in the R/N field, and control branches at step 404 to step 405 to compare the partial echo data contained in the PE field of the control channel with a portion of the message stored in the buffer 209. If they substantially match, control branches at step 405 to step 406 to determine whether the mobile station still has a message to transmit. If the answer is affirmative at step 406, control branches to step 407 to transmit the message on the next frame and store a copy of that message in the buffer 209, and returns to step 404. If the mobile station has no more message to transmit, control branches at step 406 to step 412 to discard the stored copy of signals from the buffer 209, and control returns to step 400.

If the comparison of the PE field at step 405 reveals that there is a substantial mismatch between the copy of partial data returned from the base station and the corresponding part of the stored data, the mobile station recognizes that a data collision occurred on the previous frame, and control branches to step 408 to increment the collision count value "C" of collision memory 210 by 1 and store the frame number of the frame on which the previous control message was sent into the first entry of the frame number locations of memory 210. Steps 409 to 411 are executed to transmit a copy of the previous message containing a collision field in which the collision count C is set to 1 and the frame number of the previous frame is set. Steps 404, 405, 408 to 411 will be looped again if the message of second transmission encounters a collision again by updating the collision field of the second transmission with C=2 and the frame numbers of the frames of the first and second transmissions. If data corruption occurs again, the above process will be repeated until the message is properly received by the base station, while incrementing the count C by 1 in response to each data corruption and adding the identification of a corrupted frame to the list of collision frame numbers.

For a full understanding of the present invention, reference is had to a time sequence diagram shown in FIG. 5. During frame #N of a previous multiframe, no control message is assumed to have been sent from mobile stations. The base station transmits a signaling message with I/B=I, R/N=N and PE=all zeroes (steps 318, 314). With I/B=I, mobile station #1 sends a control message during the next frame #1. The message is properly received by the base station, which returns a message containing I/B=B, N/R=R and PE=copied data (step 312). During frame #2, no message is sent from mobile stations and interference is assumed to occur. A down-link control message containing I/B=I, N/R=N and PE=0 is broadcast from the base station and status $S_2$ is set to 1. During frame #3, mobile station #2 sends a message encounters a data collision with a signal from an adjacent cell. As a result, the base station stores a bit "1" into the #3 location of frame status memory 108, thus setting frame status variable $S_3=1$ (step 317), and transmits a message containing I/B=I, N/R=N and PE=0 (steps 318, 314). During frame #4, mobile station #2 acknowledges that the previous transmission has failed and retransmits a copy of the previous message containing C=1 and frame number FN=3. This up-link control message is successfully received by the base station, and a down-link control message containing I/B=B, N/R=R and PE=copied data is transmitted and frame status variable $S_3$ is reset to zero (steps 306, 307). During frame #5 no signal is sent from mobile stations and a message containing I/B=I, N/R=N and PE=0 is sent from the base station.

During frame #6, mobile stations #1 and #2 simultaneously send messages and a collision occurs. As a result, the base station returns a message containing I/B=I, N/R=N and PE=0 and stores a bit "1" into the #6 location of frame status memory 108, thus setting frame status variable $S_6=1$. It is assumed that after random delay times mobile stations #1 and #2 are respectively given access to frames #7 and #9. During frame #7, mobile station #1 retransmits a copy of the previous message containing a collision count C=1 and frame number FN=6 (step 408). In response, the base station resets the #6 location of frame status memory 108 to zero, resetting frame status variable $S_6=0$ (steps 306, 307). No message is sent during frame #8. During frame #9, mobile station #2 retransmits a copy of the previous message containing a collision count C=1 and frame number FN=6, and the base station repeats the same process as in frame #7.

During frame #N, a message is sent from mobile station #m and the base station returns a message containing I/B=I, N/R=R and PE=copied data (step 313, 314) to give a chance to all base stations to access the first frame of the next multiframe.

In the above example, frame #3 is the only frame where interference has occurred, whereas in the prior art interference detection technique frames #3 and #6 are counted. The above process is repeated during the period of the timer and the number of interference-affected frames is determined (step 316) and reported to the MTSO 120 where the report is collected and analyzed to determine the radio interference ratio of the system. Since data collision is excluded from the report, the radio interference ratio of the control channel of a TDMA cellular mobile communication system can be precisely determined.

What is claimed is:

1. A communication system having a base station and a plurality of mobile stations, said base station and said mobile stations establishing up-link frames for transmission of signals from the mobile stations to the base station and down-link frames for transmission of signals from the base station to the mobile stations, said base station comprising:

means for receiving an up-link control message on one of said up-link frames;
   a frame status memory;
   determining means for determining whether the quality of the received up-link control message is affected or unaffected during transmission, and storing a corruption status indication into a position of said frame status memory corresponding to said one up-link frame if said quality is determined to be affected;
   means for detecting a frame identification from the received up-link control message and erasing the corruption status indication stored in the position of the frame status memory corresponding to the detected frame identification; and
   means for transmitting a down-link control message on one of said down-link frames, the transmitted down-link control message indicating whether the quality of the received up-link control message is determined by said determining means as being affected or unaffected;
   each of said mobile stations comprising:
   means for transmitting said up-link control message on one of said up-link frames when said one up-link frame is available for all of the mobile stations;
   means for receiving said down-link control message transmitted on said one of said down-link frames;
   a collision memory; and
   means, responsive to the received down-link control message indicating that the quality of the up-link control message is affected, for storing the frame identification of said one of said up-link frames into said collision memory and repeatedly causing said transmitting means to retransmit a copy of the transmitted up-link control message containing a copy of the stored frame identification until the received down-link control message indicates that the quality of the up-link control message is unaffected.

2. A communication system as claimed in claim 1, wherein said base station is connected to a switched telephone network and includes means for counting the corruption status indications stored in said frame status memory at periodic intervals to produce an interference count, and reporting the count to said network.

3. In a communication system having a base station and a plurality of mobile stations, said base station and said mobile stations establishing up-link frames for transmission of signals from the mobile stations to the base station and down-link frames for transmission of signals from the base station to the mobile stations, said base station including a frame status memory and each of said mobile station including a collision memory, a method comprising:

a) transmitting from a mobile station an up-link control message on one of said up-link frames when said one up-link frame is available for all of the mobile stations;
   b) receiving, at said base station, said up-link control message and determining whether the quality of the received up-link control message is affected or unaffected during transmission;
   c) storing, at said base station, a corruption status indication into a position of said frame status memory corresponding to said one up-link frame if said quality is determined to be affected;
   d) detecting, at said base station, a frame identification from the received up-link control message and erasing the corruption status indication stored in the position of said frame status memory identified by the detected frame identification;
   e) transmitting from said base station a down-link control message on one of a plurality of down-link frames, the transmitted down-link control message indicating whether the quality of the received up-link control message is affected during transmission;

f) receiving said down-link control message at said mobile station; and g) if the received down-link control message indicates that the quality of the up-link control message is affected, storing, at said mobile station, the frame identification of said up-link frame into said collision memory, retransmitting a copy of the transmitted up-link control message containing a copy of the stored frame identification, and repeating the steps (f) and (g) until the received down-link control message indicates that the quality of the up-link control message is unaffected.

4. A method as claimed in claim 3, further comprising counting, at said base station, the corruption status indications stored in said frame status memory at periodic intervals to produce an interference count.

* * * * *